United States Patent
Thomsen et al.

(10) Patent No.: US 10,746,159 B2
(45) Date of Patent: Aug. 18, 2020

(54) ROTOR RESTRAINING AND ROTATING APPARATUS AND METHOD FOR WIND TURBINES

(71) Applicant: Vestas Wind Systems A/S, Aarhus N. (DK)

(72) Inventors: Kristoffer Isbak Thomsen, Århus N (DK); Thomas Møller Christiansen, Hjortshøj (DK)

(73) Assignee: Vestas Wind Systems A/S, Aarhus N. (DK)

( * ) Notice: Subject to any disclaimer, the term of this patent is extended or adjusted under 35 U.S.C. 154(b) by 8 days.

(21) Appl. No.: 16/337,654

(22) PCT Filed: Oct. 2, 2017

(86) PCT No.: PCT/DK2017/050324
§ 371 (c)(1),
(2) Date: Mar. 28, 2019

(87) PCT Pub. No.: WO2018/072796
PCT Pub. Date: Apr. 26, 2018

(65) Prior Publication Data
US 2019/0345914 A1    Nov. 14, 2019

(30) Foreign Application Priority Data
Oct. 20, 2016    (DK) .................................. 2016 70827

(51) Int. Cl.
*F03D 7/02*    (2006.01)
(52) U.S. Cl.
CPC .......... *F03D 7/0248* (2013.01); *F03D 7/0268* (2013.01)
(58) Field of Classification Search
CPC ............................. F03D 7/0248; F03D 7/0268
See application file for complete search history.

(56) References Cited

U.S. PATENT DOCUMENTS

| | | | |
|---|---|---|---|
| 3,895,884 A | * | 7/1975 | Andrews .................. F01D 7/00 416/153 |
| 8,028,604 B2 | | 10/2011 | Moore et al. |

(Continued)

FOREIGN PATENT DOCUMENTS

| | | |
|---|---|---|
| CN | 202645876 U | 1/2013 |
| CN | 102979673 A | 3/2013 |

(Continued)

OTHER PUBLICATIONS

European Patent Office, International Search Report and Written Opinion in PCT Application No. PCT/DK2017/050324, dated Jan. 9, 2018.

(Continued)

*Primary Examiner* — Woody A Lee, Jr.
(74) *Attorney, Agent, or Firm* — Wood Herron & Evans LLP

(57) ABSTRACT

Rotor restraining and rotating apparatus and methods for a wind turbine (1) are described. An apparatus (200) has a rotatable control element (204) associated with a rotor (8, 203) of the wind turbine, the control element being at least part-circular in form, the control element comprising a plurality of engagement formations (205) disposed on a periphery thereof. The apparatus also has a control member (206), comprising a plurality of engagement formations (207). The control member is movable (208) in a first degree of freedom between: (a) a non-restraining position; and (b) a restraining position in which the control member engagement formations are able to engage the control element engagement formations to restrain rotation of the control element. The control member is also movable (209) in a second degree of freedom. In the restraining position, on movement of the control member in the second degree of freedom, the control member engagement formations are (Continued)

operable to move the control element engagement formations thereby to cause rotation of the control element.

14 Claims, 7 Drawing Sheets

(56) References Cited

U.S. PATENT DOCUMENTS

| | | | |
|---|---|---|---|
| 2008/0181761 A1 | 7/2008 | Moore et al. | |
| 2009/0278359 A1 | 11/2009 | Trede | |
| 2011/0133473 A1 | 6/2011 | Signore et al. | |
| 2012/0133147 A1* | 5/2012 | Numajiri | F03D 7/0268 290/55 |
| 2014/0377062 A1* | 12/2014 | Jakobsen | F03D 80/50 416/1 |
| 2015/0118056 A1* | 4/2015 | Rose, Jr. | F03D 80/50 416/220 R |

FOREIGN PATENT DOCUMENTS

| | | |
|---|---|---|
| CN | 202811677 U | 3/2013 |
| CN | 205605365 U | 9/2016 |
| EP | 1167754 A2 | 1/2002 |
| EP | 1167755 A2 | 1/2002 |
| EP | 2500597 A1 | 9/2012 |
| EP | 2987999 A1 | 2/2016 |
| KR | 101346177 B1 | 12/2013 |
| KR | 101346178 B1 | 12/2013 |
| KR | 20140001043 A | 1/2014 |
| WO | 2013045290 A1 | 4/2013 |

OTHER PUBLICATIONS

Danish Patent and Trademark Office, Search and Exam Report in PA 2016 70827, dated Apr. 20, 2017.

China National Intellectual Property Administration, First Notification of Office Action in CN Application No. 201780063536.X, dated Jan. 22, 2020.

* cited by examiner

ROTOR RESTRAINING AND ROTATING APPARATUS AND METHOD FOR WIND TURBINES

FIELD OF THE INVENTION

This invention is directed to types of rotor restraining and rotating apparatus for wind turbines, and methods of operating such apparatus.

BACKGROUND OF THE INVENTION

Wind turbines for power generation are well known in the art. In a common arrangement, a nacelle is mounted on a tower, with a rotor and blades being mounted on the nacelle. The rotor is mounted on a rotor shaft which is supported in the nacelle by a shaft housing.

In certain situations, the rotor must be stopped, maintained in position, or locked to prevent any rotary movement, for example so that maintenance work can be carried out on the rotor or nacelle. In general, rotor braking and locking mechanisms are known. In one previously considered arrangement, a locking hub is mounted on the rotor shaft. The locking hub is a radial flange with holes that can be engaged by locking pins mounted to and movable to and from the housing. In another previously considered system, a brake disc connectable to the rotor shaft has a series of serrations on its outer rim, and a brake block with two corresponding serrations is brought from a radial direction into contact with the brake disc serrations, to prevent rotary movement of the brake disc, thereby stopping the rotor rotating. However, these radially applied brakes require additional space in the housing, and may also be relatively insecure even at low rotor torques, without considering the increasing use of larger rotors for wind turbines.

In these (and other) situations, it may also be necessary for the rotor to be rotated somewhat, for example to move a section to be maintained to an area accessible for maintenance. Previously considered assemblies typically use an additional turning gear for providing such rotation; a turning gear engages with teeth provided on the rotor, to turn the rotor. Such turning gears are another additional component to be accommodated in limited space within the rotor housing. In addition, some previously considered systems provide only limited turning/rotating ability in the turning gear; others may not be applicable to the larger rotors in increasing use, as they may not provide sufficient torque to turn such larger rotors. Other previously considered techniques provide turning gears which are affixed or permanently applied or engaged to the corresponding rotor gear; this entails that in normal use the rotor may be impeded or at least rendered less efficient by the turning gear assembly.

The present invention aims to address these problems and provide improvements upon the known devices and methods.

STATEMENT OF INVENTION

One embodiment of an aspect of the invention can provide a rotor restraining and rotating apparatus for a wind turbine, comprising: a rotatable control element associated with a rotor of the wind turbine, the control element being at least part-circular in form, the control element comprising a plurality of engagement formations disposed on a periphery thereof; and a control member, comprising a plurality of engagement formations, wherein the control member is movable in a first degree of freedom between: (a) a non-restraining position; and (b) a restraining position in which the control member engagement formations are able to engage the control element engagement formations to restrain rotation of the control element, wherein the control member is movable in a second degree of freedom, and wherein in the restraining position, on movement of the control member in the second degree of freedom, the control member engagement formations are operable to move the control element engagement formations thereby to cause rotation of the control element.

Thus a single part of the assembly, the control member, can provide both restraining and rotation functions for the rotor of the wind turbine. This saves space inside the housing, complexity and cost, as no additional components are required to provide the rotary function. In addition, in contrast with previously considered devices, the control element is free to rotate when the rotary control is not being applied, because the control member is not in the restraining position.

The control member may be a locking, or locking and rotating, member providing such functions. The control element associated with the rotor may be couplable to, cooperate with, comply with, or collaborate with said rotor. The control member's restraining of the control element may moderate, adjust, brake, constrain, lock, handle or regulate the (rotation of the) control element. The movement of the control member in the second degree of freedom may compel or oblige reciprocal movement of the control element to cause the rotation, or corresponding or complementary movement of the control element to cause the rotation. The non-restraining position may be a stowed position.

The engagement formations on either or both of the control element and control member may be projections, serrations, engagement structures, or teeth. The formations may be for mating, cooperating with or meshing with the corresponding elements on the element/member.

The control element may be a disc or ring, or an annular element. The axis of the control element may not necessarily be the same as that of the rotor.

Optionally, the control member is movable in the second degree of freedom in a direction tangential to the at least part-circular control element.

This means that the second degree of freedom can be a lateral or translatory movement, which in turn means that the movement can be provided by a linear actuator rather than a rotary actuator. This then allows for a much more powerful actuator to be used to rotate the control element using the control member, so that larger rotors can be controlled, and malfunction of the control member's rotary function can be avoided or minimised.

Suitably, the control member is movable in the first degree of freedom in a direction aligned with a rotating axis of the rotatable control element.

In an embodiment, the apparatus comprises a first actuator coupled to the control member for moving the control member in the first degree of freedom, and a second actuator coupled to the control member for moving the control member in the second degree of freedom.

In another embodiment, the control member comprises a first control member component movable in the first degree of freedom, and a second control member component movable in the second degree of freedom. Optionally, the second control member component is slidably connected to a housing of the rotor.

Suitably, following movement of the control member in the second degree of freedom to cause rotation of the control element, the control member is movable back to the non-restraining position, and is further movable back to a starting position in the second degree of freedom. This allows another cycle of the restraining and rotating functions to be performed.

In an embodiment, the control member engagement formations are disposed on a radially inwardly facing portion of the control member, and project radially inward from said inwardly facing portion.

Suitably, in the restraining position, the control member is disposed in the plane of the rotatable control element, in a position adjacent to said periphery of the control element, and in the non-restraining position, the control member is spaced from the position in the plane of and adjacent to the periphery of the control element.

In an embodiment, the control element engagement formations comprise a set of teeth projecting from the periphery of the control element.

In embodiments, the control member engagement formations comprise a set of teeth projecting from the control member.

Suitably, the control element teeth project radially outward from the periphery thereof, and the control member teeth project radially inward from the control member, and the apparatus is configured in the restraining position to mesh the respective sets of teeth together.

One embodiment of another aspect of the invention can provide a method of restraining and rotating a wind turbine rotor using a rotor restraining and rotating apparatus comprising: a rotatable control element associated with the wind turbine rotor, the control element being at least part-circular in form, the control element comprising a plurality of engagement formations disposed on a periphery thereof; and a control member, comprising a plurality of engagement formations, the method comprising: moving the control member in the first degree of freedom from a non-restraining position to a restraining position so that the control member engagement formations are able to engage the control element engagement formations to restrain rotation of the control element; and with the control member in the restraining position, moving the control member in the second degree of freedom to move, by the control member engagement formations, the control element engagement formations to cause rotation of the control element.

One embodiment of another aspect of the invention can provide a wind turbine rotor system comprising a main rotor housing that supports a main rotor shaft, and a rotor restraining and rotating apparatus in accordance with any of the above described aspects.

One embodiment of another aspect of the invention can provide a wind turbine including the wind turbine rotor system of the above aspect.

One embodiment of another aspect of the invention can provide a rotor restraining and rotating apparatus for a wind turbine, comprising: a rotatable control element associated with a rotor of the wind turbine, the control element being at least part-circular in form, the control element comprising a plurality of engagement formations disposed on a periphery thereof; and a control member, comprising a plurality of engagement formations, wherein the control member is movable in a first degree of freedom between: (a) a non-restraining position; and (b) a restraining position in which the control member engagement formations are able to engage the control element engagement formations to restrain rotation of the control element, wherein the control member is movable in a second degree of freedom to rotate the locking element when so engaged in the restraining position.

BRIEF DESCRIPTION OF THE DRAWINGS

The invention will now be described by way of example with reference to the accompanying drawings, in which.

DETAILED DESCRIPTION OF EMBODIMENTS

Embodiments of the invention combine the function of a rotor locking or restraining mechanism, and a rotor rotating mechanism, into a single control member able to fulfil both functions, by moving the control member in two separate degrees of freedom, one for each function. In a specific embodiment of the invention, this is achieved by moving the control member axially into a restraining position engaging a control/locking ring of the rotor, and then moving the control member tangentially to the control ring to move the ring, and thus rotate the rotor. This and other embodiments of the invention will be described below in more detail.

Figure 1:
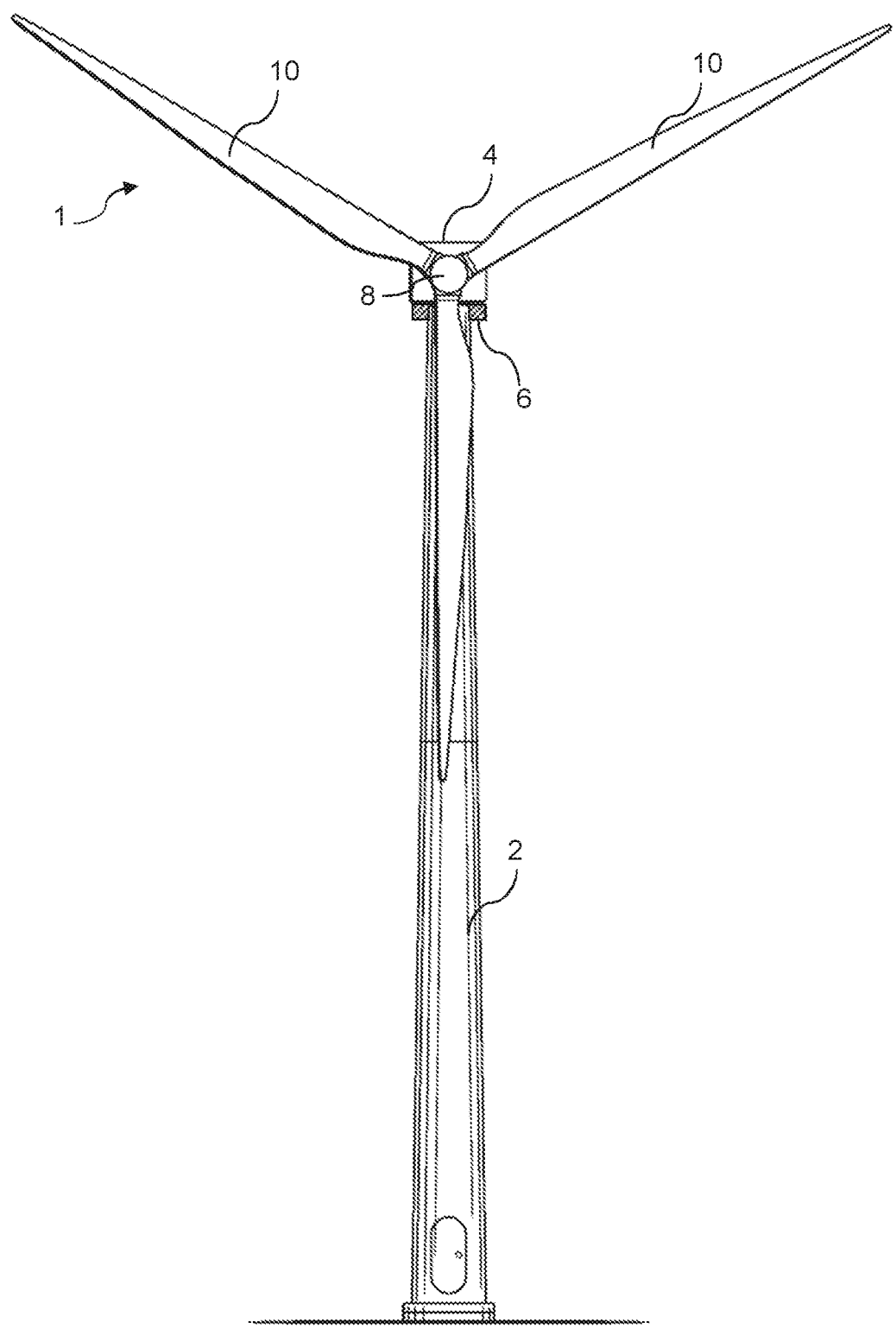
FIG. 1 is a diagram illustrating a typical wind turbine arrangement.

Referring to FIG. 1, a wind turbine 1 according to an embodiment of the invention comprises a tower 2, a nacelle 4 rotatably coupled to the top of the tower 2 by a yaw system 6, a rotating hub 8 mounted to the nacelle 4 and a plurality of wind turbine rotor blades 10 coupled to the hub 8. The nacelle 4 and rotor blades 10 are turned and directed into the wind direction by the yaw system 6. The nacelle 4 may house generating components of the wind turbine, including the generator, gearbox, drive train and brake assembly, as well as convertor equipment for converting the mechanical energy of the wind into electrical energy for provision to the grid. It may be noted that "direct drive" wind turbines that do not use gearboxes are also known; a gearbox may therefore be optional.

The nacelle 4 also necessarily contains a main shaft housing (not shown in FIG. 1), which houses a main rotor shaft (collectively referred to as a rotor system) that is connected at a forward end to the hub 8 and rotor blades 10, and at a rear end to the generating components.

Figure 2:
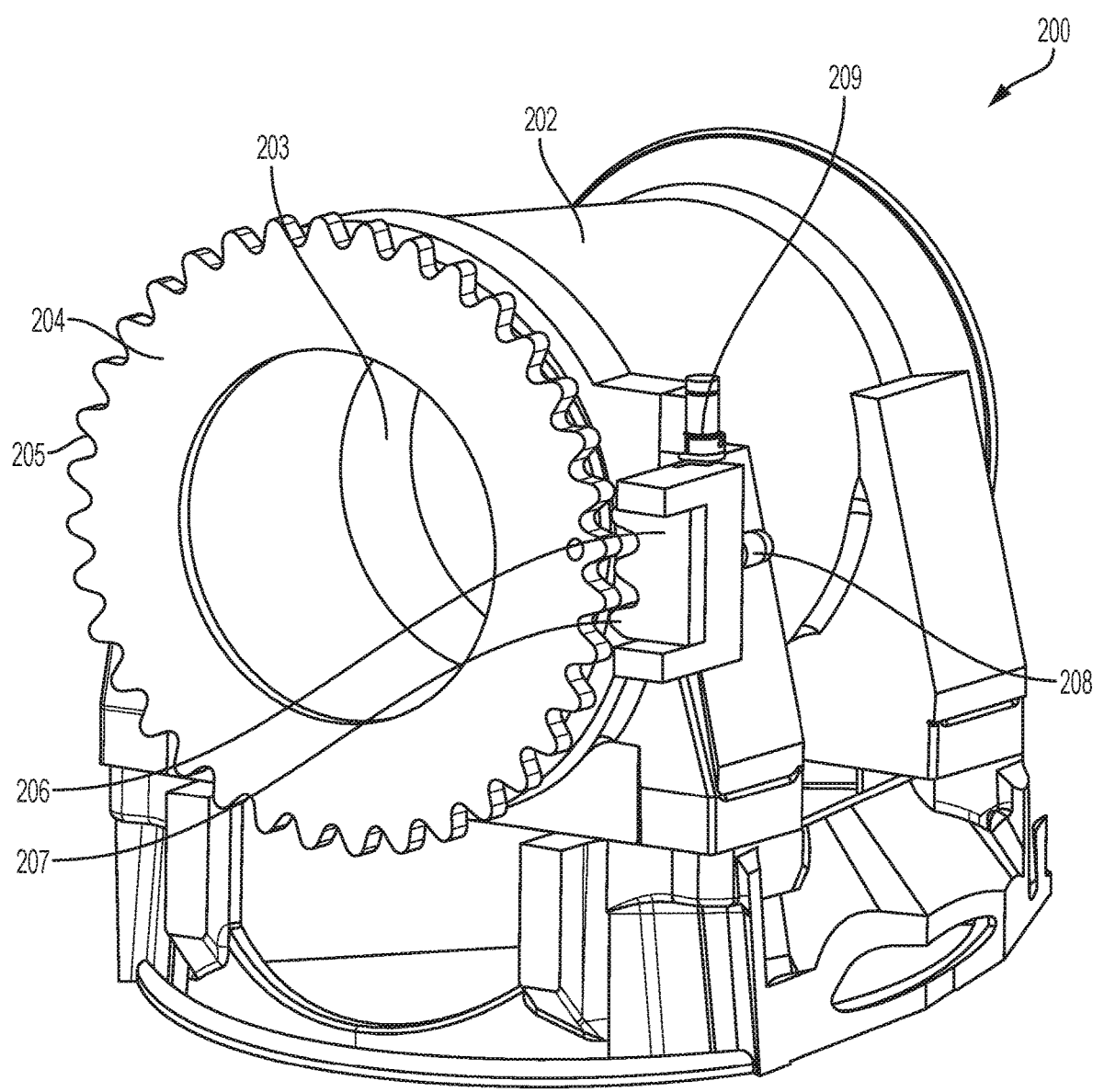
FIG. 2 is a schematic diagram of parts of a wind turbine, according to an embodiment of the invention.

FIG. 2 shows a close-up view of an assembly 200 of the wind turbine, that includes restraining and rotating apparatus (206, 208, 209) and a main shaft housing 202; it may be appreciated that, for convenience, the assembly 200 is shown in isolation here without any of the other generating equipment attached to it.

The main shaft housing 202 encloses a rotor shaft 203 which is attached to the hub 8. The main shaft housing 202 also comprises a front bearing and a rear bearing (both not shown) which are suitable bearings, such as roller bearings, that enable the rotor shaft 203 to rotate about a horizontal axis. Note that in the art, a main shaft housing may also be referred to as a main bearing housing.

The assembly also comprises a circular control element 204, which may also be considered as a restraining/locking (or rotary engagement) element 204, which in this embodiment takes the form of a control ring. It may also be referred to as a 'locking ring' or 'locking disc'. The control ring is mounted, co-axially, on the rotor shaft 203, and therefore rotates with it: if the control ring can be stopped, locked or restrained, the rotor shaft will also be stopped, preventing rotation of the turbine rotor blades 10; if the control ring can (then) be moved, to rotate the locking ring, the rotor shaft will also be rotated.

In this embodiment the control ring 204 is a single part, although it may also be a multipart assembly. Furthermore, although in this embodiment the control ring 204 is circular such that it extends about the entirety of an axial position along the shaft, the control ring 204 may instead be a part-circular element that extends only part-way about the rotor shaft.

In alternative embodiments, there may be arrangements in which the control ring/element is not mounted directly on the rotor shaft, but is either mounted indirectly (but co-axially), or cooperates with the rotor shaft in some way (for example via a gearing system); however, in such embodiments, the cooperation is nevertheless such that, if the control element is restrained or stopped, this has the effect of restraining or stopping the rotor shaft so as to lock the rotor out, and if the control element is (then) rotated, this has the effect of rotating the rotor shaft.

The control ring 204 comprises a set of engagement formations, in this embodiment in the form of serrations or teeth 205 projecting radially outwards from the outer periphery of the control ring. These formations are for mating with the corresponding formations on the control or restraining/rotating member so that when the control member is actuated in the first degree of freedom, the meshing of the formations causes the control ring to be constrained, and in the second degree of freedom, cause the control ring to rotate.

It can be seen that the particular form of the engagement formations may vary in alternative embodiments. For example, the formations may take the form of crenellations (that is, square shaped teeth) or other means capable of engaging the control member so as to constrain the control ring, but also move it once engaged. The formations may also not be similar on the control ring and the control member; it may be that one has a male element and the other a female element for engaging each other.

In other embodiments, the formations may not project radially outwards, but may project axially (such as in a crown gear), with the control member having formations which also project axially to engage them. In other embodiments, the formations may be on an inner periphery of the control ring, with the formations projecting radially inwards, with the control member having formations projecting radially outwards.

In the embodiment illustrated in FIG. 2, the control ring teeth are continuous around the outer periphery of the control ring. This enables engagement of the control or locking/rotating member at any point on the control ring. In alternative embodiments however, it may be that the engagement formations are discontinuous; there may be gaps in the series of formations, for example to allow space for other minor elements of the assembly, or it may be that in some cases a locking/control section on one side or along one circumferential section or arc of the control ring is sufficient, and that the control ring can simply be rotated until the locking/control section of the control ring is aligned with the control member. Expressed another way, the control ring teeth should extend along a significant part of the circumference of the control ring, but need not extend around the entire circumference.

In this embodiment, the control (restraining/rotating) member 206 is mounted on the rotor housing 202. Therefore the rotor and control ring 204 are normally free to rotate inside the housing, but on axial engagement of the control member with the control ring, since the control member 206 is securely fastened to the housing, the control ring 204 and hence the rotor 203 are no longer free to rotate as before. In embodiments, when the control member 206 is so engaged, rotation is only permitted by (further) movement of the control member 206.

Figure 3:
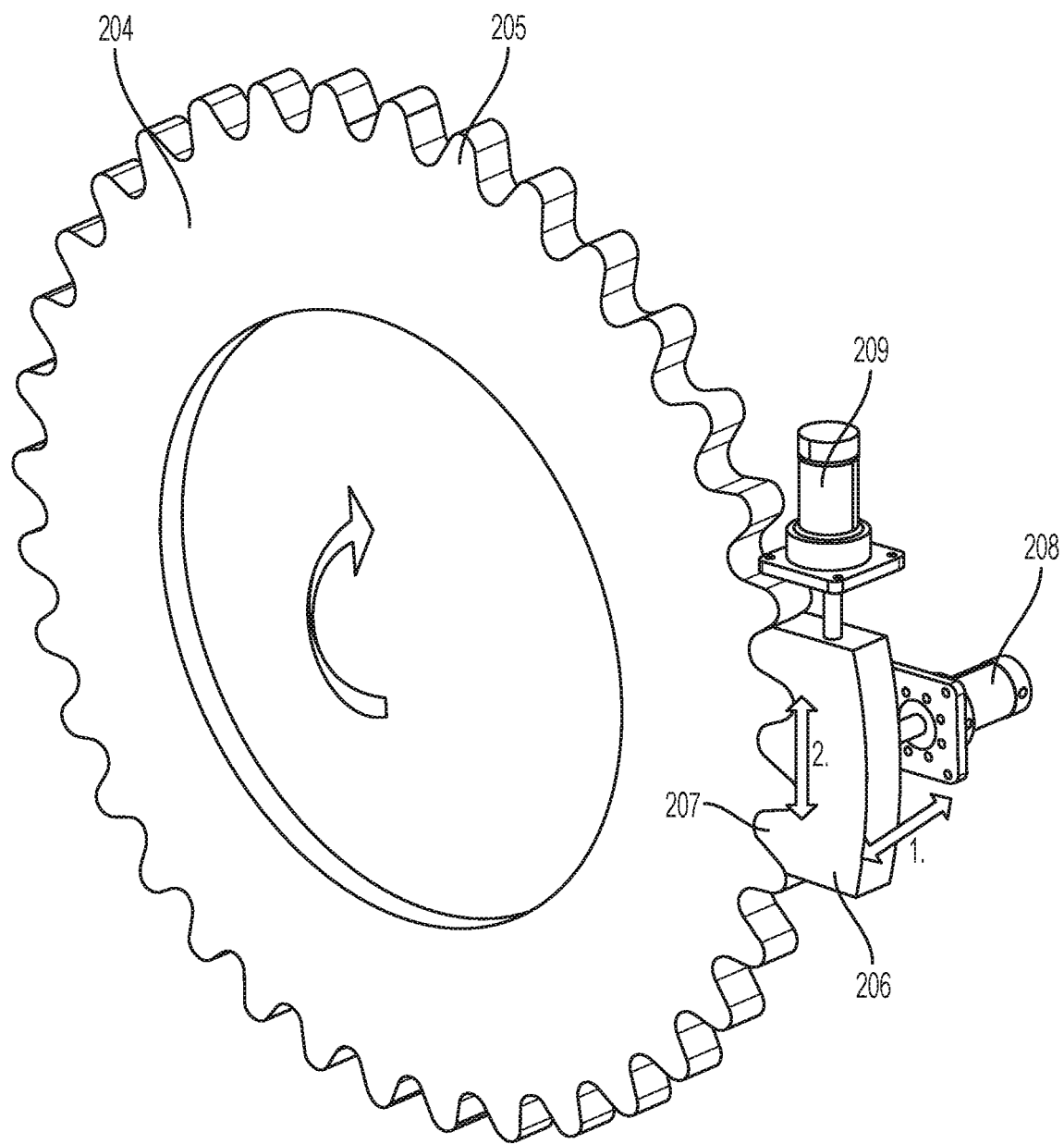
FIG. 3 is a schematic diagram of the control element and control (restraining/rotating) member, according to an embodiment of the invention.

As can be seen from FIGS. 2 and 3, the control member 206 has engagement formations 207 which are for meshing or cooperating with the engagement formations 205 of the control ring 204, in this embodiment in the form of teeth projecting radially inward towards the control ring 204. Thus, when the control member 206 is in the restraining position, the teeth engage directly with the adjacent control ring teeth.

Again, in alternative embodiments, the formations on the control member 206 may take different forms, in order to cooperate with the different possible forms outlined above regarding the control ring 204.

The control member 206 is disposed on the housing and is firstly movable in a first degree of freedom, between a stowed position, and a restraining/locking position at which the engagement formations on the control member engage or mesh with the corresponding and complementary formations on the control ring, thereby constraining movement of the control ring (and therefore if necessary locking out the rotor). In this embodiment, the control member is moved between the two positions by a first actuator 208 mounted on the housing. The actuator may be a hydraulic, linear electric, magnetic, or any similar suitable actuator.

The action of the first movement by the first actuator 208 can be seen in FIG. 3, an illustration of only the control ring 204, control member 206 and first (208) and second (209) actuators from FIG. 2. The arrow 1 indicates the direction of movement of the control member, axially to the control ring.

The first actuator 208 moves the control member 206 axially (in the direction of the axis of the rotor and control ring) from the stowed position to the restraining or locking position. In the restraining position, the control member 206 is thus disposed radially outward of the control ring 204, and in contact with a circumferential portion of the control ring.

This is in contrast to previously considered systems in which a brake is applied radially to a locking portion; the axial movement of the control member 206 may allow for the locking arrangement to be more secure than such radial means, and may save space in the limited capacity of the rotors housing, since no additional radial space for the control member is needed.

However, in alternative embodiments of the invention, the control member 206 may be applied radially to enmesh the engagement formations to restrain the rotor, followed by the second movement (in a different degree of freedom, such as tangentially) of the control member 206 to rotate the rotor via the enmeshed engagement formations.

In other alternative embodiments, it may be that the axial movement of the first actuator 208 is actually applied off-axis, though with some component of the movement in the axial direction. For example, it may be that the geometry of a particular rotor housing prevents an exact axial approach of the control member into the restraining position, but nevertheless that the approach having some component in the axial direction still provides the advantages of saving space and/or providing a more secure restraining basis than for a radially applied member.

Returning to FIG. 2, secondly the control member 206 is movable in a second degree of freedom, in this embodiment in a direction tangential to the (circular) control ring 204. This direction is indicated by arrow 2 in FIG. 3; the second actuator 209 mounted on the housing 202 can move the control member linearly back and forth in this tangential direction. Again this second actuator may be a hydraulic, linear electric, magnetic, or any similar suitable actuator.

As can be seen from FIG. 3, where the control member is in the restraining position with the teeth (207) of the control member meshing with the teeth (205) of the control ring 204, the actuation of the second actuator 209 moving the control member 206 in a linear, tangential direction will act to rotate the control ring 204. Thus, the first actuator 208 provides the locking/restraining action of the control member, and the second actuator 209 provides the rotation action required. As may be noted from FIG. 3, the distance of the movement of the control member 206 in the tangential direction is relatively small compared to the size of the control ring 204; this means that the angle through which the control ring 204, and hence the rotor 203, will be rotated is also relatively small. This allows accurate, fine rotational movements of the rotor to position it precisely for the necessary task, for example maintenance of a particular area.

An improvement of this arrangement over other arrangements is that the single control member 206 (along with the action of the actuators 208, 209) can provide both the locking/restraining and precise rotating functions. This is in contrast to a system in which an additional component for the rotation (such as a turning gear) must be provided, or in which an additional mechanism or component must be added/removed from the control member or control arrangement in order for it to provide both functions.

Another improvement is that the means for moving the control member 206 in both degrees of freedom are integrated into the assembly; this is in contrast to other arrangements in which for example the means for controlling rotation of the control ring via the control member 206 may only be activated using an external drive, such as a handheld driver or the like.

A further improvement is that although the control member is capable of both degrees of freedom of movement to provide both these functions, it is nevertheless still readily removable or detachable (via the actuators) from the control ring. This is in contrast to alternative arrangements in which a control member might need to be permanently applied to or engaged with the control ring in order to provide both functions.

It may be noted that FIG. 3 illustrates only the control ring 204, the control member 206, and the first and second actuators 208 and 209; alternative arrangements for using this set of components with differing couplings to the housing and to the control member are available, some of which are outlined in the subsequent description. Initially, a specific embodiment as illustrated in FIGS. 2 and 4 to 6 is described.

Figure 4:
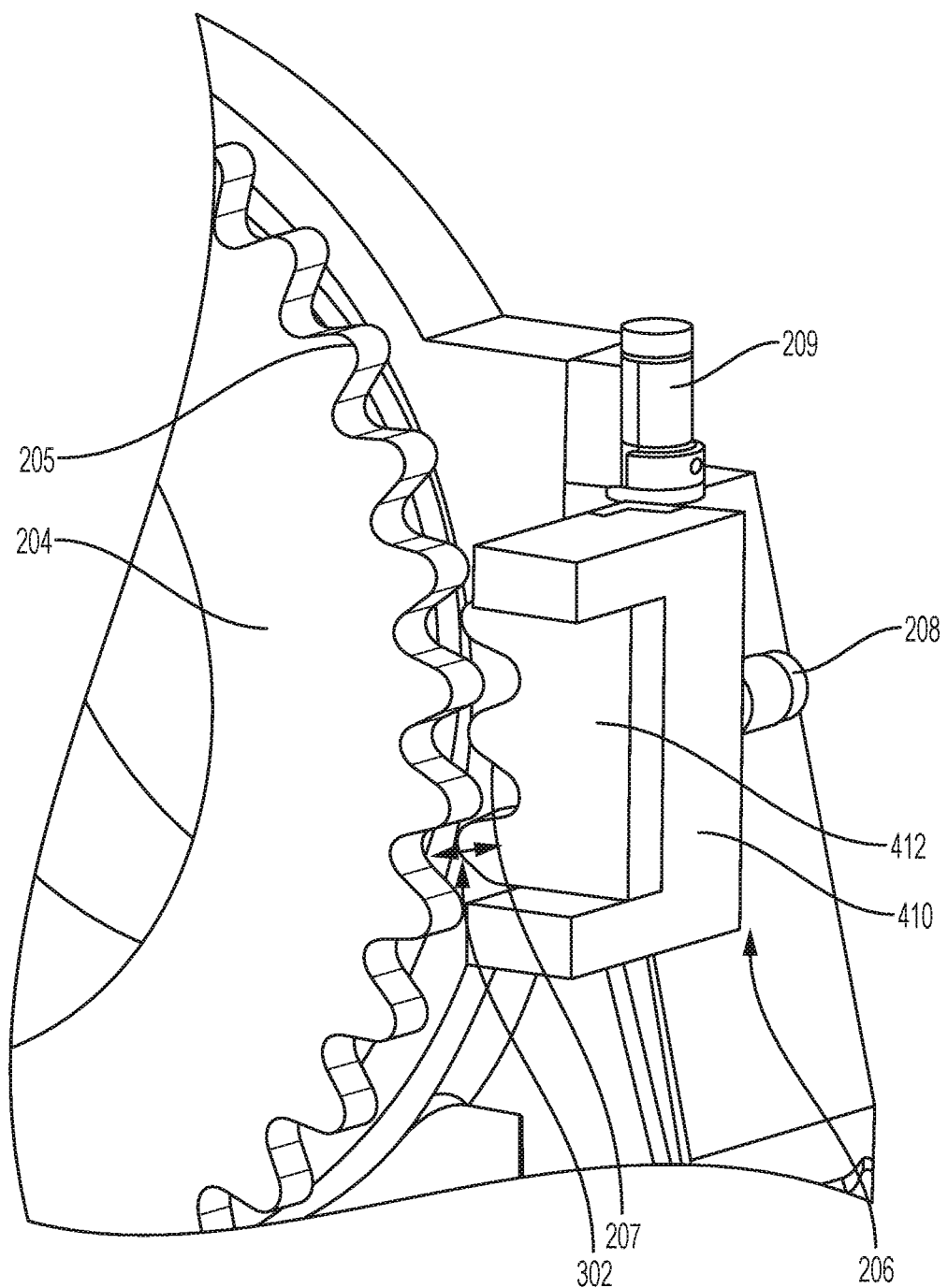
FIG. 4 is an enlarged view of the control member illustrated in FIGS. 2 and 3, according to an embodiment of the invention.
Figure 5:
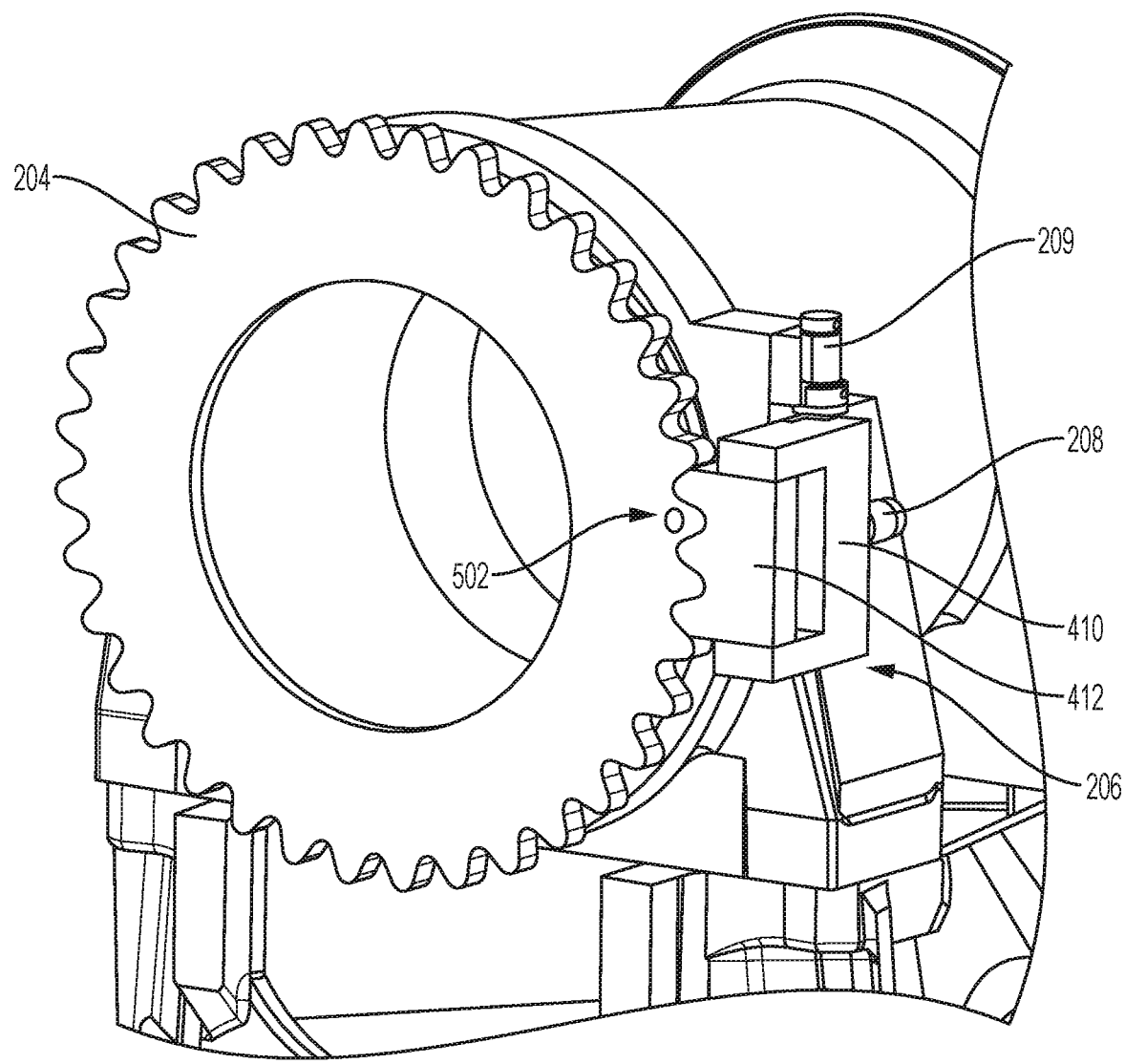
FIGS. 5 and 6 are views that illustrate the actuation of the control member to rotate the control element, according to an embodiment of the invention.
Figure 6:
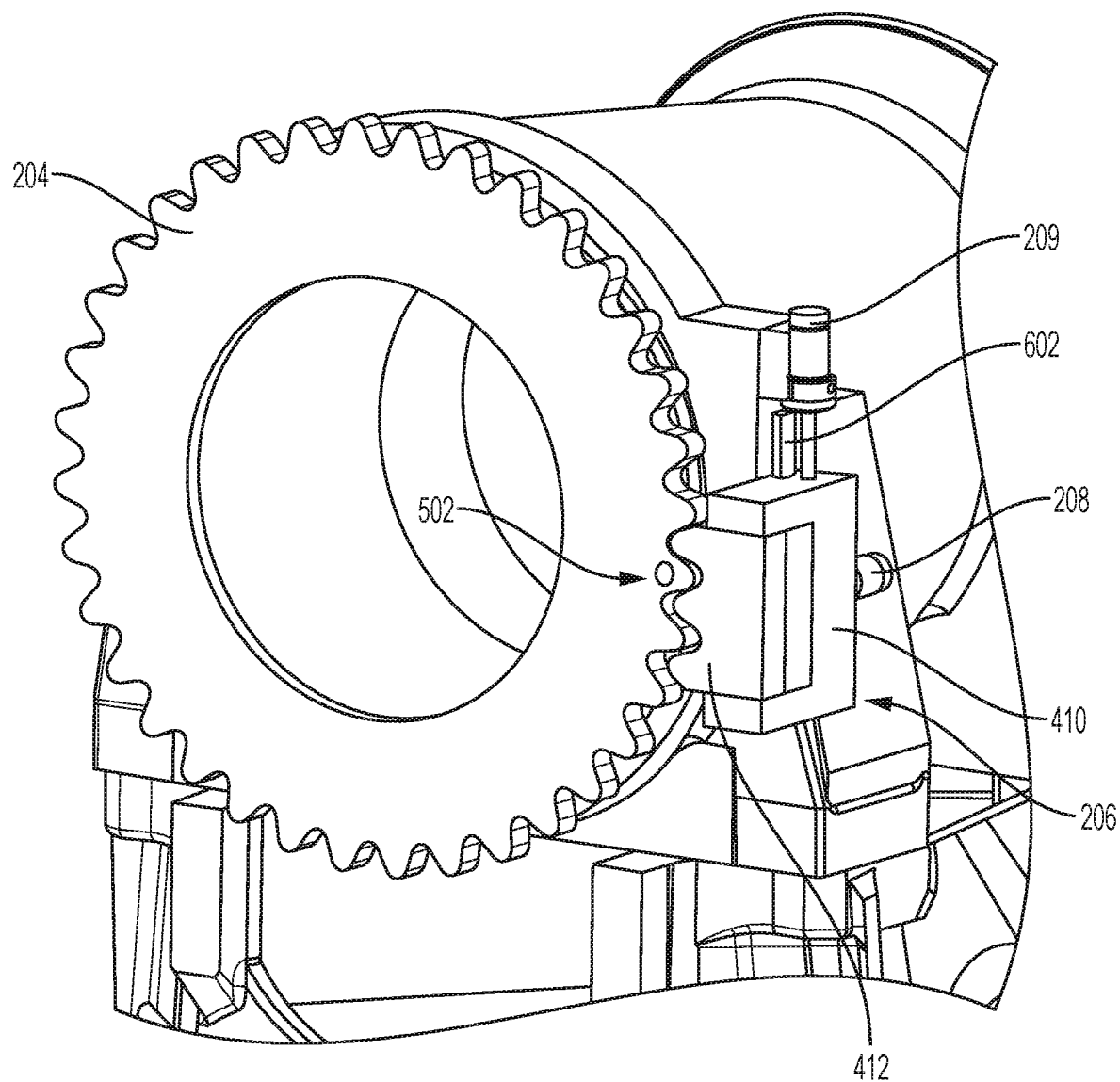

FIGS. 4 to 6 are schematic diagrams illustrating steps in the process of actuation of the control member to rotate the control element, according to embodiments of the invention. FIG. 4 is an enlargement of the sections of the apparatus shown in FIG. 2. Here, the control member is in the non-restraining position, with the first actuator 208 in its retracted, starting position. Thus, there is an axial gap indicated by arrow 302 between the control member 206 and the control ring 204. The control member 206 is also in the initial position in the tangential direction, with second actuator 209 also in its retracted, starting position.

In this particular embodiment, the control member 206 is arranged as an assembly of two components, one each actuated by the respective first and second actuators 208 and 209 to provide the two degrees of freedom of movement. The control member comprises an outer element or support block 410, which houses an inner or engagement element 412 on which the teeth 207 are disposed. This inner element is slidably mounted on the outer element so that it can move axially within the outer element. Thus in this arrangement, portions of the control member assembly, namely the ends of the outer element closest to the control ring, may start in line or in the plane of the control ring, before the movement of the toothed inner element into this plane to the restraining position.

The first actuator 208 which provides the axial movement of the control member is coupled to this inner element, so that when the first actuator 208 activates, the inner element of the control member, having the teeth 207, is moved from the non-restraining position to the restraining position engaging the control ring.

FIG. 5 illustrates the second stage, in which the first actuator 208 has been extended, the inner element 412 moved axially and the control member 206 is now in the restraining position, in the plane of the control ring 204 with the teeth of the inner element 412 of the control member meshing with those of the control ring. Thus the control ring and in turn the rotor can be prevented from movement in either rotary direction, and locked if necessary. The dot indicated at 502 is merely included to illustrate the rotation of the control ring, as will be shown in FIG. 6.

The prevention of the rotation of the control ring (and hence the rotor) by prevention of the linear/lateral movement of the control member 206 is facilitated by the mounting of the first actuator 208 on the main shaft housing 202 (which prevents unwanted lateral movement) and/or the resistance of the second actuator 209 when not activated. The action of either of these components may be varied in order to provide a more secure locking of the rotor; for example, it may be that the second actuator 209 may be over-specified (e.g. be capable of providing greater actuation force) for the task of moving the control member tangentially to rotate the rotor, because it is also required to resist unwanted movement of the control ring in its locking role. In an alternative embodiment, in order that the second actuator can be provided with a back-up for its roles both restraining the control element against torque on the rotor, and actuating the control member to rotate it, an additional latch (not shown) can be provided to provide an additional lock in the restraining position. This additional latch may be actuated at the point at which the control member (206) meshes with the control ring (204), in case of failure of or partial loss of power in the second actuator 209. The latch may be deactivated on actuation of the second actuator, or indeed deactivated by the movement of the second actuator.

The mounting of the first actuator 208 onto the main shaft housing 202 will in this embodiment require that the actuator is movable along the housing in the direction tangential to the control ring 204, in order to allow the secondary movement (to rotate the control ring) provided by the second actuator 209. In this embodiment the support block 410 is movable along a slider (602, see FIG. 6) mounted on the housing to accommodate this movement. In alternatives, the movement may be facilitated by another such means, such as a rail or linear bearing. In a further alternative, the means may be provided on the mounting of the first actuator on the control member, so that the actuator is fixed on the housing, but the control member can move laterally along a sliding means to accommodate the secondary tangential movement.

In other embodiments, the slider 602 incorporates a restraining mechanism of its own (such as an additional actuator) in order to help prevent movement of the control member when it is in the restraining position, and hence providing the initial rotor locking action.

Returning to the steps illustrated in FIGS. 4 to 6, FIG. 6 illustrates the stage following the engagement of the control member 206 in the restraining position. The second actuator 209 is now extended, which has moved the support block 410 (housing the inner element 412) linearly downwards, in a direction tangential to the control ring 204. This movement downwards prompted by the actuator is facilitated by the rail or slider 602 incorporated into the housing 202, on which the support block 410 is movable.

Since the teeth of the inner element 412 of the control member 206 were enmeshed with those of the control ring 204 (see FIG. 5) this movement has had the effect of moving the control ring 204 reciprocally (to the movement of the control member), and hence rotating the control ring 204 around its axis. The dot 502 can be seen to have moved position, by an angle of rotation implied by the tangential distance moved by the control member. In practice, the force exerted downwards by the second actuator 209 is transmitted from the teeth of the control member to the enmeshed teeth of the control ring, the downwards force resolving into rotation of the control ring, since it is axially mounted (rather than linearly, as for the control member).

It can be seen therefore that in this embodiment it is the support block 410 that is moved tangentially by the second actuator 209. The support block thus allows the engagement element 412 to move axially, but is also moved tangentially by the second actuator. The first actuator 208 is mounted to the support block and moves with it. It will be seen in comparison of FIGS. 5 and 6 that the first actuator 208 has moved downwards relative to the housing 202 as the support block 410 moved along its slider/rail mounting 602.

In this embodiment, the second actuator 209 is coupled to the support block/outer element, so that when this second actuator is activated, the second movement (tangentially to the control ring) is performed, moving both the outer element and the inner element mounted within it, in the tangential direction, thus moving the teeth of the control member tangentially to rotate the control ring.

It may be noted that in such embodiments of the invention in which the control member is moved laterally or tangentially to provide the rotation or turning of the control element, this has the significant advantage that the rotary action can be provided by a linear movement of the control member, so that a linear actuator can be used to rotate the rotor. Linear actuators in such arrangements can be much more powerful (at least for their size/weight) than comparable rotary actuators, which is especially advantageous for the much larger turbines in current use. Such (more powerful) linear actuators may also be less likely to malfunction than a rotary actuator or drive attempting to provide the turning gear or movement.

Thus the two components of the control member assembly in FIGS. 2 and 4 to 6 can move separately, but are nevertheless part of the same control member assembly (i.e. they house the same engagement formations (teeth) that actually provide both the locking and rotating functions).

In alternatives embodiments, the control member may be comprised of a single component rather than two components. In such embodiments, the mounting of the second actuator 209 on the control member 206 may incorporate similar slider or linear translation means to those used elsewhere on the assembly, so that although the second actuator 209 is fixed to the housing 202, it allows movement of the control member in the axial direction. In a further alternative, the second actuator 209 may be mounted fixedly to the control member, and slider means or the like may be provided on the housing 202 to allow movement of the second actuator 209 when the axial (first) actuator 208 is activated.

It will be clear to the skilled reader that various alternative arrangements for providing the two functions in the same control member will be possible. For example, it may be that in some cases there may be space for the control member to be applied radially (as noted above), rather than axially, into the restraining position, followed by the tangential movement to rotate the control ring.

In another alternative, it may be that one or both of the degrees of freedom of movement is rotary in nature. For example, the control member may comprise a pinion feature which may be axially engaged with the control member, but the rotation of the control member may be actuated by rotation of the pinion feature, rather than tangential movement of the control member. In a further alternative, the control member may incorporate a worm gear or the like, with cooperating engagement elements on the control ring; the worm gear may again be applied axially, and then rotated to provide the control ring rotation.

It may be noted that in another alternative embodiment of the invention, the engagement formations on the control element may, instead of being disposed on an outer periphery as shown in the Figures, be disposed on an inner periphery, such as an inside surface of a control ring. In such case, the control member would be introduced (axially) to engage this inner periphery to provide the restraining function, and then moved in the second degree of freedom inside the control ring to provide the rotation. In another alternative, the formations may be disposed on a side outer periphery, such as a crown gear. The control member here then may be introduced axially to engage the crown gear, with the control member engagement formations correspondingly facing in the axial direction. The control member can then be moved in the second degree of freedom (e.g. laterally) to provide the rotary control.

As can be seen from the Figures, the control member 206 and the control ring 204 have teeth (207, 205) projecting radially towards each other. In embodiments of the invention, the teeth take the form of rounded triangulations along the opposing faces. The rounded teeth allow for an easier meshing action during the axial movement from the stowed (non-restraining) position to the locking/restraining position. Leading and trailing edges of the teeth, with respect to the axial direction of movement, may be rounded, burred or chamfered or otherwise smoothed, to help the teeth engage smoothly.

In some embodiments, the engagement formations of the control member may be formed so that the peaks of the locking teeth, that is the teeth tips, are angled, tapered, or inclined in the direction of the control ring, so that a rear-most edge of the control member tooth peak is radially further inward, that is to say higher, than the front edge, the front edge being the closest to the control ring in the stowed position. The taper of the teeth from rear to front can be set at a give gradient or angle. Expressed another way, the teeth are shaped to define a slight wedge shape between their leading and trailing edges.

This arrangement means that as the control member teeth are pushed further onto the control ring 204 the contact between the control member teeth 207 and the control ring teeth 205 is increased, because of the increasing gradient of the control member teeth, and their effective progression radially inwards towards the control ring.

This can facilitate an easier engagement sequence, as there may be initially a looser fit between the teeth, and then a tighter fit as the control member is moved further axially towards the control ring. This arrangement therefore accommodates slight misalignment between the teeth of the control member 206 and the control ring 204 prior to engagement. The tapering can also provide eventually a more secure locking of the rotor, as the more the control member is pushed onto the control ring, the more surfaces of the meshing teeth will be in contact with each other, and the more the control member will exert force radially inwards onto the control ring. This system can therefore prevent residual play in the locking system experienced by previously considered systems.

It should be noted that the troughs of the control member teeth, and indeed the entire profile of the teeth can be tapered in this way. This means that not only does the radial force inward on the control ring increase as the control member is pushed onto the ring, but in the same manner the force will increase along the entire tooth profile, with additional force exerted laterally/circumferentially between the teeth along the tapering profile.

In embodiments of the invention, an initial alignment step may be undertaken, to align the peaks of the teeth of the control member 206 with the troughs of the teeth of the control ring, to facilitate an efficient locking stage. In an embodiment, the teeth on the control member can be tapered (as described above) sufficiently that such a step to initially align the control member may be obviated—the tapered profile can effectively push the control ring around a small rotation as the control member is actuated into place.

In another alternative embodiment, the engagement formations or teeth on both the control ring and the control member may be tapered in this way and/or as described above, for ease of engagement and to allow an even more secure engagement once the control member is finally in place.

Figure 7:
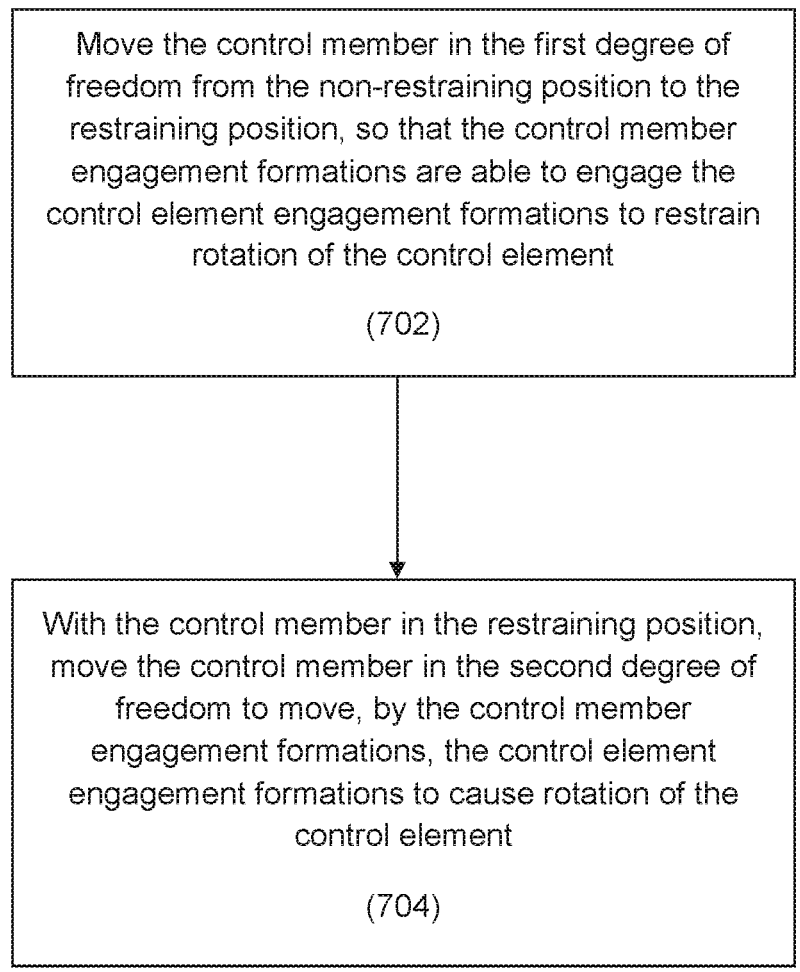
FIG. 7 is a view that illustrates steps of a method according to an embodiment of the invention.

FIG. 7 is a diagram illustrating steps of a method according to an embodiment of the invention. As described above, the control member is moved (from the initial stowed, non-restraining position shown in FIG. 4) in the first degree of freedom to the restraining position (as shown in FIG. 5), so that the control member engagement formations are able to engage the control element engagement formations, to restrain rotation of the control element (702). With the control member in the restraining position (FIG. 5), the control member is then moved in the second degree of freedom to move, by the control member engagement formations, the control element engagement formations (as shown in FIG. 6) to cause rotation of the control element (704).

It will be appreciated by those skilled in the art that the invention has been described by way of example only, and that a variety of alternative approaches may be adopted without departing from the scope of the invention, as defined by the appended claims.

The invention claimed is:

1. A rotor restraining and rotating apparatus for a wind turbine, comprising:
   a rotatable control element associatable with a rotor of the wind turbine, the control element being at least part-circular in form, the control element comprising a plurality of engagement formations disposed on a periphery thereof;
   a control member, comprising a plurality of engagement formations, wherein the control member is movable in a first degree of freedom between: (a) a non-restraining position; and (b) a restraining position in which the control member engagement formations are able to engage the control element engagement formations to restrain rotation of the control element, wherein the control member is movable in a second degree of freedom, and wherein in the restraining position, on movement of the control member in the second degree of freedom, the control member engagement formations are operable to move the control element engagement formations thereby to cause rotation of the control element;
   a first actuator coupled to the control member for moving the control member in the first degree of freedom; and
   a second actuator coupled to the control member for moving the control member in the second degree of freedom.

2. The apparatus according to claim 1, wherein the control member is movable in the second degree of freedom in a direction tangential to the at least part-circular control element.

3. The apparatus according to claim 1, wherein the control member is movable in the first degree of freedom in a direction aligned with a rotating axis of the rotatable control element.

4. The apparatus according to claim 1, wherein the control member comprises a first control member component movable in the first degree of freedom, and a second control member component movable in the second degree of freedom.

5. The apparatus according to claim 4, wherein the second control member component is slidably connected to a housing of the rotor.

6. The apparatus according to claim 1, wherein following movement of the control member in the second degree of freedom to cause rotation of the control element, the control member is movable back to the non-restraining position, and is further movable back to a starting position in the second degree of freedom.

7. The apparatus according to claim 1, wherein the control member engagement formations are disposed on a radially inwardly facing portion of the control member, and project radially inward from said inwardly facing portion.

8. The apparatus according to claim 1, wherein in the restraining position, the control member is disposed in the plane of the rotatable control element, in a position adjacent to said periphery of the control element, and wherein in the non-restraining position, the control member is spaced from the position in the plane of and adjacent to the periphery of the control element.

9. The apparatus according to claim 1, wherein the control element engagement formations comprise a set of teeth projecting from the periphery of the control element.

10. The apparatus according to claim 1, wherein the control member engagement formations comprise a set of teeth projecting from the control member.

11. The apparatus according to claim 10, wherein the control member engagement formations comprise a set of teeth projecting from the control member, wherein the control element teeth project radially outward from the periphery thereof, and wherein the control member teeth project radially inward from the control member, and wherein the apparatus is configured in the restraining position to mesh the respective sets of teeth together.

12. A method of restraining and rotating a wind turbine rotor using a rotor restraining and rotating apparatus comprising:
- a rotatable control element associated with the wind turbine rotor, the control element being at least part-circular in form,
- the control element comprising a plurality of engagement formations disposed on a periphery thereof; and
- a control member, comprising a plurality of engagement formations,
- the method comprising:
- moving the control member in the first degree of freedom from a non-restraining position to a restraining position so that the control member engagement formations are able to engage the control element engagement formations to restrain rotation of the control element; and
- with the control member in the restraining position, moving the control member in the second degree of freedom to move, by the control member engagement formations, the control element engagement formations to cause rotation of the control element.

13. A wind turbine rotor system comprising a main rotor housing that supports a main rotor shaft, and a rotor restraining and rotating apparatus in accordance with claim 1.

14. A wind turbine including the wind turbine rotor system of claim 13.

* * * * *